(12) United States Patent
Teixeira

(10) Patent No.: US 9,844,978 B2
(45) Date of Patent: Dec. 19, 2017

(54) REINFORCED BICYCLE RIM

(71) Applicant: Specialized Bicycle Components, Inc., Morgan Hill, CA (US)

(72) Inventor: Chuck Teixeira, Bonny Doon, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 0 days.

(21) Appl. No.: 15/262,953

(22) Filed: Sep. 12, 2016

(65) Prior Publication Data

US 2016/0375724 A1    Dec. 29, 2016

Related U.S. Application Data

(63) Continuation of application No. 14/179,119, filed on Feb. 12, 2014, now Pat. No. 9,440,498.

(51) Int. Cl.
| | |
|---|---|
| *B60B 25/08* | (2006.01) |
| *B60C 15/02* | (2006.01) |
| *B60B 21/10* | (2006.01) |
| *B60C 3/02* | (2006.01) |
| *B60B 5/02* | (2006.01) |
| *B60B 21/02* | (2006.01) |
| *B60B 21/04* | (2006.01) |
| *B60B 21/12* | (2006.01) |

(Continued)

(52) U.S. Cl.
CPC ............ *B60B 25/08* (2013.01); *B60B 5/02* (2013.01); *B60B 21/025* (2013.01); *B60B 21/026* (2013.01); *B60B 21/04* (2013.01); *B60B 21/10* (2013.01); *B60B 21/104* (2013.01); *B60B 21/12* (2013.01); *B60B 25/06* (2013.01); *B60C 3/02* (2013.01); *B60C 15/0209* (2013.01); *B60B 1/003* (2013.01); *B60B 21/021* (2013.01); *B60B 2360/10* (2013.01); *B60B 2360/32* (2013.01); *B60B 2360/3416* (2013.01); *B60B 2360/50* (2013.01); *B60B 2900/212* (2013.01); *B60B 2900/5116* (2013.01); *B60C 29/02* (2013.01); *B60C 2200/12* (2013.01); *B60Y 2200/13* (2013.01); *Y10T 152/10747* (2015.01)

(58) Field of Classification Search
CPC ....... B60B 21/02; B60B 21/026; B60B 21/04; B60B 21/10; B60B 21/102; B60B 21/104; B60B 21/108; B60B 21/12; B60B 21/125; B60B 2900/212; B60B 25/08; B60B 25/06; B60B 21/025; B60C 15/0209; B60C 15/0213; B60C 15/022; B60C 15/0223; B60C 15/0226; B60C 3/02; B60C 5/02
USPC ........... 152/375, 378 R, 379.3, 379.4, 379.5, 152/381.3, 381.4, 381.5
See application file for complete search history.

(56) References Cited

U.S. PATENT DOCUMENTS 2,913,034 A * 11/1959 Wall ..................... B60C 5/16
    152/513
5,820,709 A    10/1998 Matsuda
        (Continued)

*Primary Examiner* — John D Walters
(74) *Attorney, Agent, or Firm* — Michael Best & Friedrich LLP

(57) ABSTRACT

A bicycle wheel including a hub and a rim coupled to the hub. The wheel also includes a cover that is coupled to rim and that defines a bead seat engageable by a tire. The rim can have a first annular feature and the cover can have a second annular feature that is complementary to the first annular feature to attach the cover to the rim.

20 Claims, 7 Drawing Sheets

(51) Int. Cl.
*B60B 25/06* (2006.01)
*B60B 1/00* (2006.01)
*B60C 29/02* (2006.01)

(56) References Cited

U.S. PATENT DOCUMENTS

| | | | | |
|---|---|---|---|---|
| 7,104,300 B2 * | 9/2006 | Veux | ............... | B60B 21/025 |
| | | | | 152/379.4 |
| 7,464,994 B2 * | 12/2008 | Okajima | ............... | B60B 1/041 |
| | | | | 301/58 |
| 8,544,514 B2 * | 10/2013 | Gangloff | ............... | B60B 21/025 |
| | | | | 152/381.6 |
| 8,905,491 B2 * | 12/2014 | Koshiyama | ............... | B60B 1/003 |
| | | | | 301/95.102 |
| 2005/0089646 A1 | 4/2005 | Endicott et al. | | |
| 2009/0115240 A1 | 5/2009 | Slate et al. | | |
| 2011/0018336 A1 | 1/2011 | Mercat et al. | | |
| 2012/0025597 A1 | 2/2012 | Koshiyama | | |
| 2013/0043717 A1 | 2/2013 | Poertner et al. | | |
| 2013/0049441 A1 | 2/2013 | Smart | | |

* cited by examiner

REINFORCED BICYCLE RIM

RELATED APPLICATIONS

The present application is a continuation of U.S. patent application Ser. No. 14/179,119, filed Feb. 12, 2014, the entire contents of which are hereby incorporated.

BACKGROUND

The present invention relates generally to the field of bicycles and specifically to bicycle wheels.

Bicycle wheels commonly include an axle, a hub rotatable on the axle, spokes extending radially from the hub, a rim supported by the spokes, and a tire. Some wheels also include a pneumatic tube positioned inside the tire to facilitate inflation of the tire, while other wheels are "tubeless." Typically, wheels can be damaged from impact by debris. Conventional wheels also are susceptible to "pinch" flats where the tire and tube are pinched between the rim and another hard object (e.g., rocks).

Existing rims often are primarily formed of metal or composite, but metal rims can easily dent when impacted and add weight to the wheel and composite rims provide poor strength and abrasion resistance and can easily crack. Other rims are formed of reinforced nylon, but these rims are also heavy and too flexible to provide adequate strength and stability. Also, some existing wheels include rims with tall tire-engaging walls to reduce pinch flats. However, these rims are heavy and typically do not adequately protect the rim from damage. Other tires place bumpers on top of the rim walls, but these bumpers are placed on top of the rim sidewalls and are typically soft (having a hardness less than 95 on the Shore A scale, or lower than 45 hardness on the Rockwell R scale) to protect the tire.

SUMMARY

The present invention provides a bicycle wheel including a hub and a rim coupled to the hub. The wheel also includes a cover that is coupled to rim and that defines a bead seat engageable by a tire. The rim can have a first annular feature and the cover can have a second annular feature that is complementary to the first annular feature to attach the cover to the rim.

In one embodiment, the rim includes an annular wall, and the first annular feature has one of laterally spaced annular projections extending from the annular wall and laterally spaced annular channels disposed in the annular wall. The second annular feature has the other of the annular projections and the annular channels that is engaged with the first annular feature to secure the cover on the rim.

In another embodiment, the rim includes an annular wall and the cover is removably coupled to the annular wall. The cover defines a sealing surface that is sealingly engageable by a tire.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
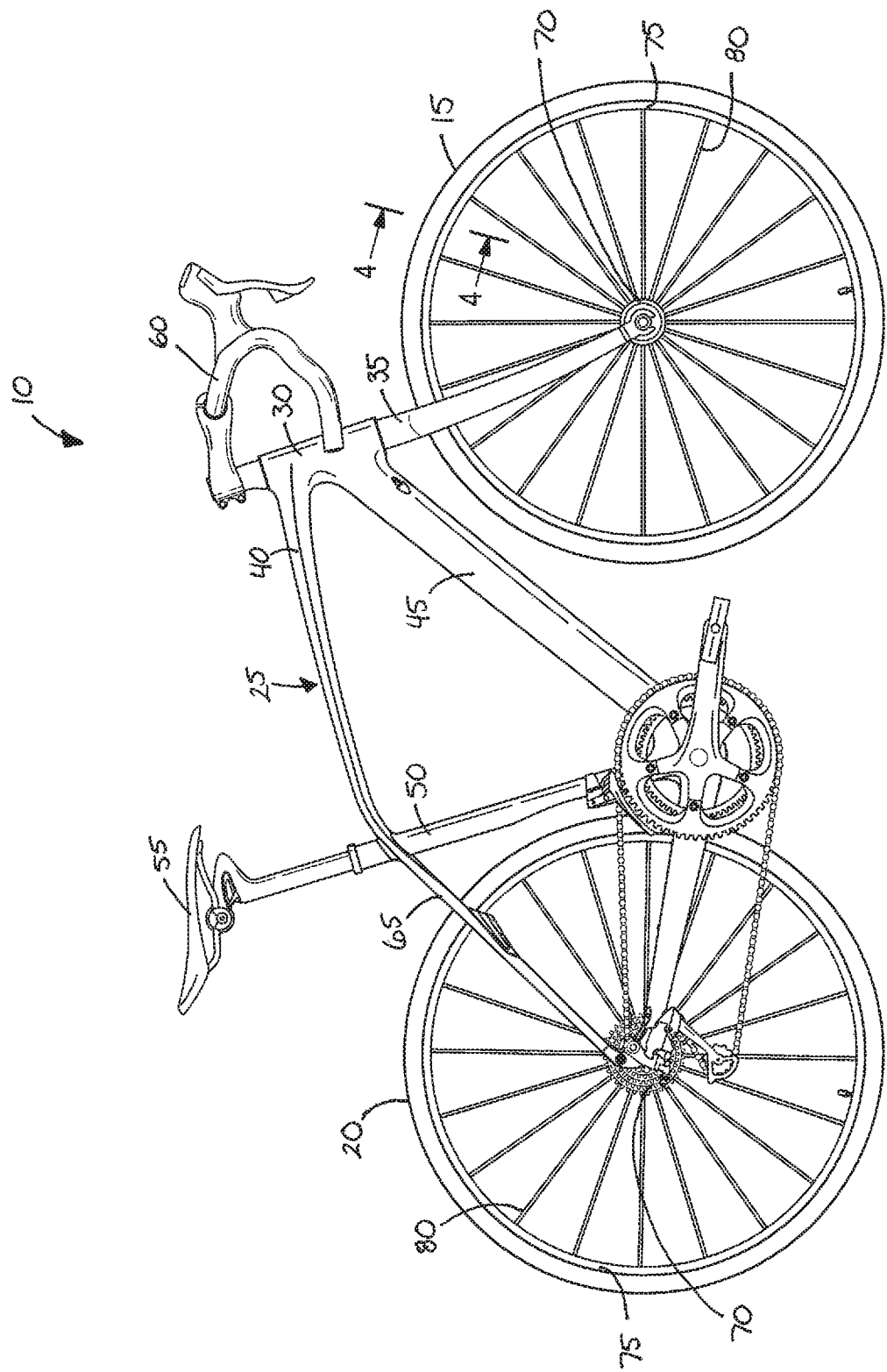
FIG. 1 is a side view of a bicycle including wheels embodying the invention.

FIG. 1 shows a bicycle 10 that includes a front wheel 15, a rear wheel 20, and a frame 25. The frame 25 has a head tube 30, a front fork 35 rotationally supported by the head tube 30, a top tube 40 connected to and extending rearward from the head tube 30, and a down tube 45 connected to the head tube 30 below the top tube 40 and extending generally downward toward a bottom bracket (not shown) of the frame 25. A seat tube 50 extends upward from the bottom bracket and is connected to the top tube 40, and a seat 55 is supported by the seat tube 50. The bicycle 10 also includes a handlebar 60 for turning the front wheel 15 via the fork 35, and the frame 25 has a rear frame triangle 65 that supports the rear wheel 20.

Figure 2:
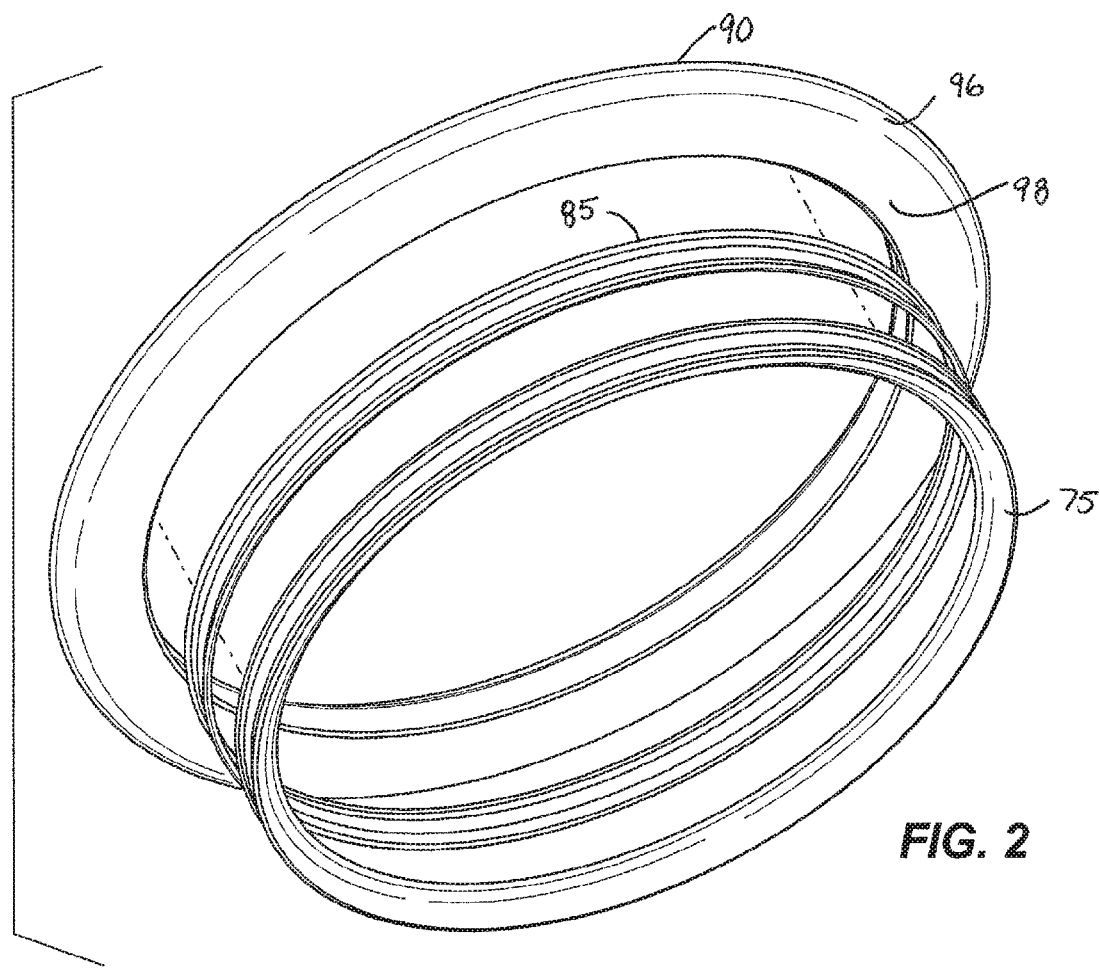
FIG. 2 is an exploded perspective view of a portion of one wheel of FIG. 1 including a rim, a rim insert, and a tire.
Figure 3:
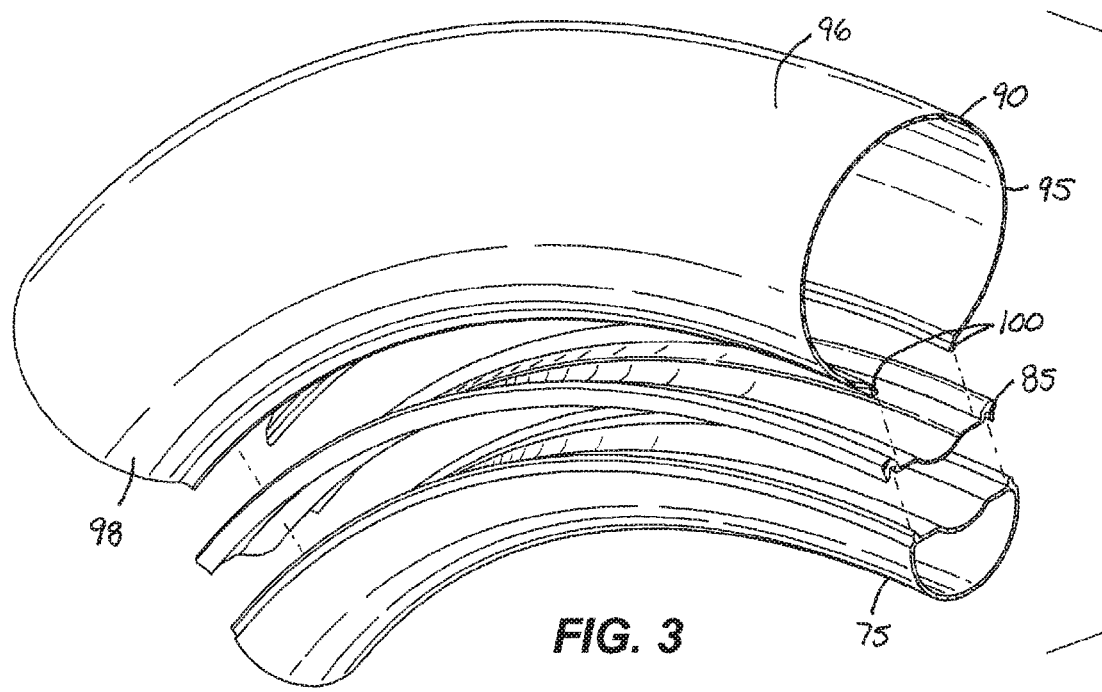
FIG. 3 is a perspective view of a portion of one wheel of FIG. 1 illustrating the rim, the rim insert, and the tire.
Figure 4:
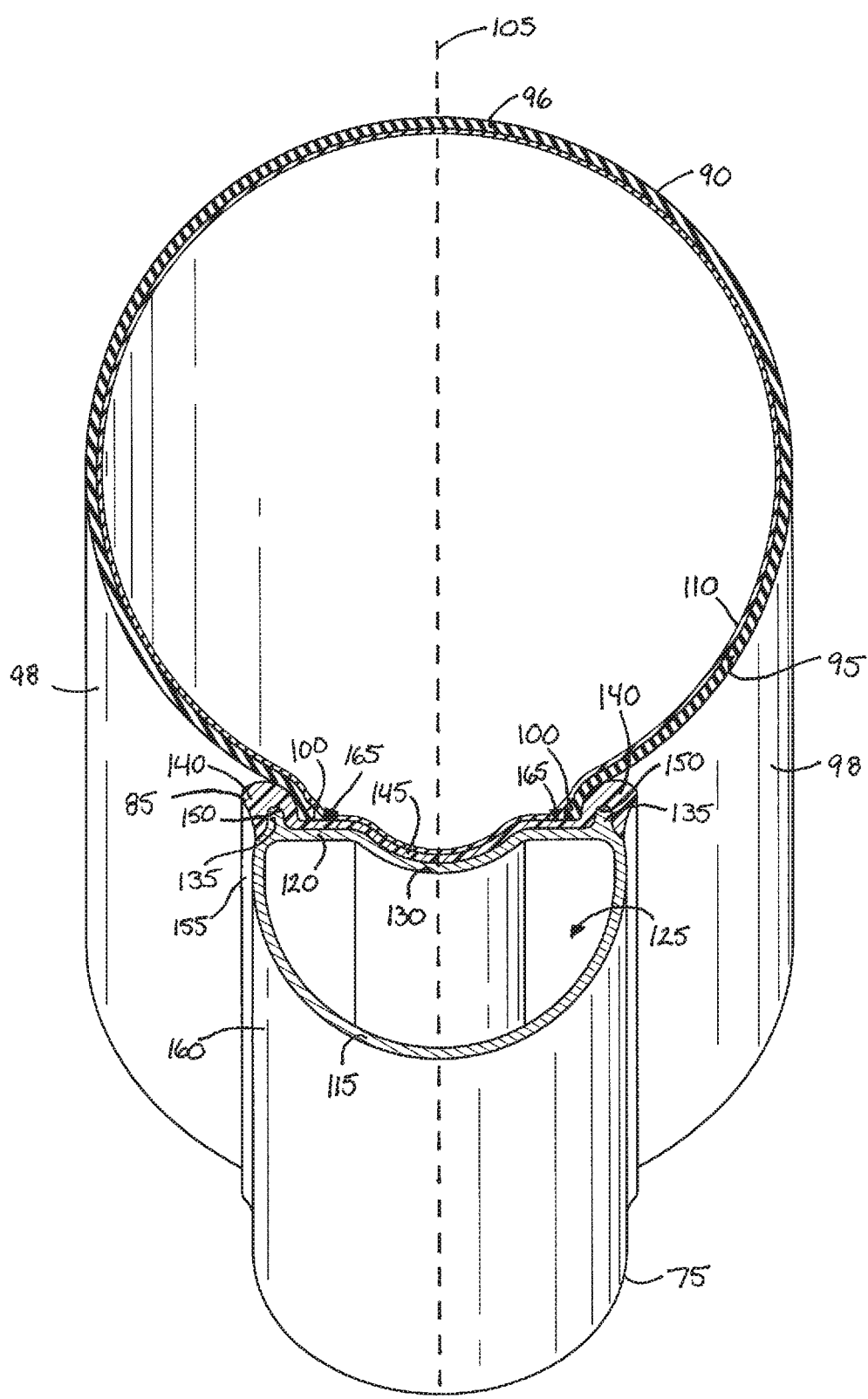
FIG. 4 is a section view of the rim, the rim insert, and the tire of the front wheel of FIG. 1 taken along line 4-4.

Referring to FIGS. 1-4, each illustrated wheel 15, 20 includes a hub 70, a rim 75 supported by the hub 70 via spokes 80 (or other wheel reinforcement members), a rim insert or cover 85 (referred to as a "cover" for purposes of description), and a tire 90 that is engaged with the rim via the cover 85. The tire 90 is defined by a tubular casing 95 having a tread portion 96 and sidewalls 98 that terminate at tire beads 100 disposed on edges of the casing 95. Each wheel 15, 20 has a central plane 105 intersecting the hub 70 and the rim 75 such that the wheel 15, 20 is symmetrical about the central plane 105. Although FIG. 4 illustrates a pneumatic tube 110 ("inner-tube") positioned inside the tire 90 to facilitate inflation of the tire 90, the tire 90 can instead be tube-less.

The rim 75 is annular and can be formed of metallic, composite, or other appropriate material. With reference to FIGS. 2-4, the illustrated rim 75 has an annular inner wall 115 and an annular outer wall 120 that is joined with the inner wall 115 such that the rim 75 is hollow and defines a cavity 125. The spokes 80 or other wheel reinforcement members can be attached to the rim 75 within the cavity 125, as is known in the art.

The outer wall 120 defines a platform to which the cover 85 is attached and has a drop-center 130 disposed on the central plane 105. As shown, the rim 75 has a first annular feature and the cover 85 has a second annular feature that is complementary to the first annular feature so that the cover 85 can be secured to the rim 75. For example, FIGS. 3 and 4 illustrate that the first annular feature is defined by projections 135 that are spaced laterally relative to the central plane 105 and that extend outward from the outer wall 120 adjacent the lateral sides of the rim 75. The illustrated projections 135 define annular ridges over which the cover 85 is attached.

The cover 85 is shaped to wrap around the rim 75 and to conform to the shape of the outer wall 120. With continued reference to FIGS. 3 and 4, the cover 85 has annular sidewalls 140 disposed on lateral sides of the cover 85, and an annular ring portion 145 that interconnects or bridges the sidewalls 140 such that the cover 85 is continuous between the sidewalls 140. Each illustrated sidewall has the second annular feature defined by an annular groove or channel 150 (referred to as a "channel" for purposes of description) that is accessible from a radially-innermost side of the cover 85 and that receives a corresponding projection 135. While the illustrated projections 135 have a substantially constant width or thickness and the channels 150 have a corresponding width or thickness, the projections 135 (and corresponding channels 150) can have bulbous or polygonal cross-sectional shapes, or other features, to mechanically secure the cover 85 on the rim 75. Adhesive can also be used to secure the cover 85 to the rim 75.

The cover 85 is oriented on the rim 75 such that the sidewalls 140 are located adjacent lateral sides of the rim 75. In this position, an exterior surface 155 of the sidewalls 140 is shaped to smoothly transition to an exterior or exposed surface 160 of the inner wall 115 of the rim 75 (e.g., to reduce drag and improve aerodynamic performance). As illustrated, the sidewalls 140 are engageable by a wall of the tire casing 95 and are curved outward relative to the central plane 105 such that the exterior surface 155 is concave.

As shown in FIG. 4, the ring portion 145 conforms to the shape of the outer wall 120 and defines bead seats 165 adjacent the inner side of the sidewalls 140 to sealingly engage the tire 90. That is, the bead seats 165 defined by the cover 85 are engaged by the tire beads 100 to secure the tire 90 to the rim 75. The sidewalls 140 and the bead seats 165 cooperatively hold the tire 90 in place when the tire 90 is inflated. Although FIG. 4 illustrates that the ring portion 145 has straight and horizontal bead seats 165, it will be appreciated that the rim 75 and the cover 85 can have other bead seat profiles (angular, curved, etc.).

Figure 5:
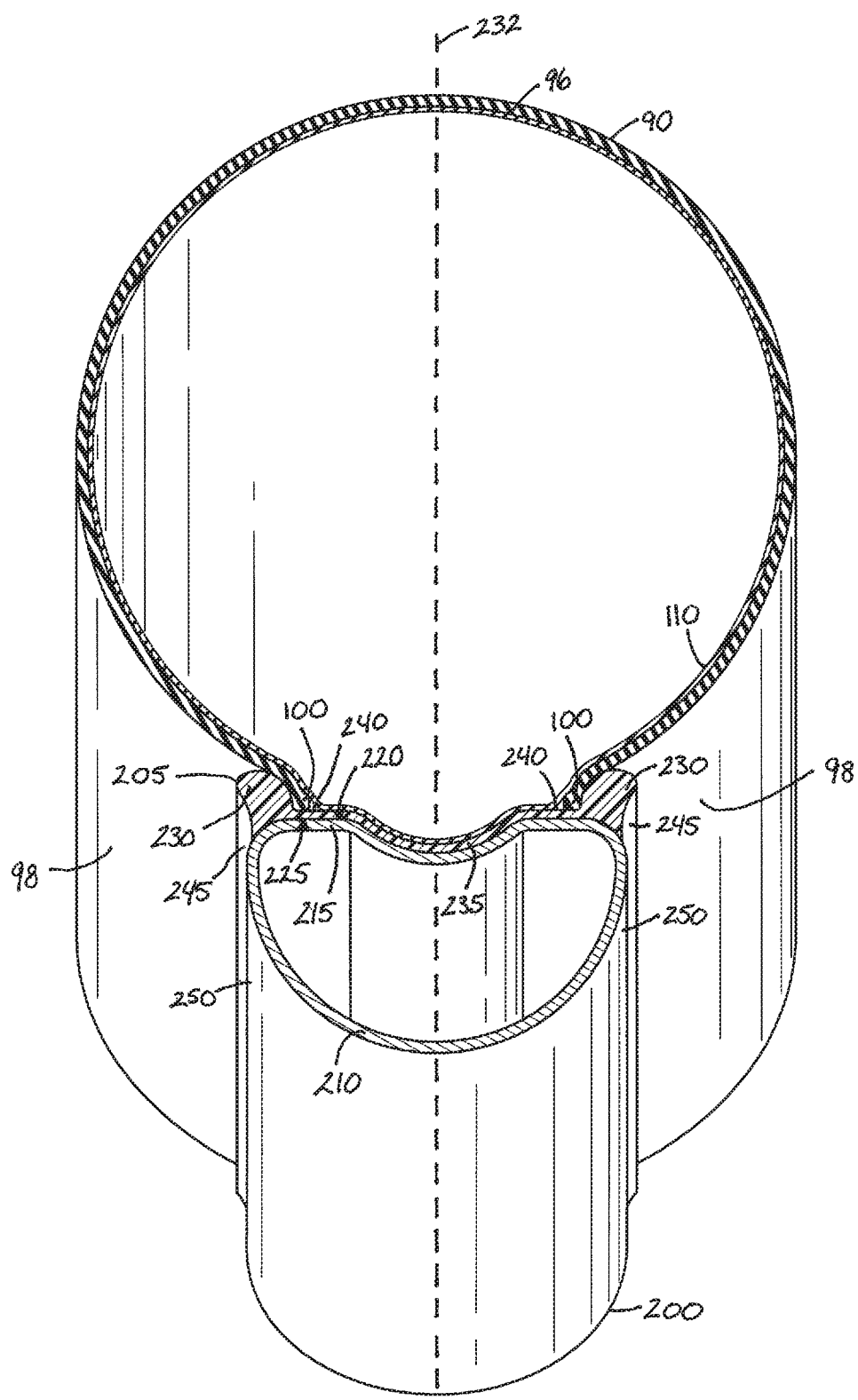
FIG. 5 is a section view of another exemplary rim and rim insert for a wheel.

FIG. 5 illustrates another exemplary rim 200 and cover 205 that can be used with the wheels 15, 20. The illustrated rim 200 has an annular inner wall 210 and an annular outer wall 215. The rim 200 illustrates the first annular feature defined by a first surface 220 of the outer wall 215, and the cover 205 has the second annular feature defined by a second surface 225 of the cover 205 that is complementary to the first annular feature so that the cover can be secured to the rim 200. The first and second surfaces 220, 225 face each other and define a smooth interface between the rim 200 and the cover 205 such that the surfaces 220, 225 are in contact with each other when the cover 205 is installed on the rim 200. The cover 205 is shaped to wrap around the rim 200 and to conform to the shape of the outer wall 215.

With continued reference to FIG. 5, the cover 205 has annular sidewalls 230 disposed on lateral sides of the cover 205 (relative to a central plane 232), and a ring portion 235 that interconnects the sidewalls 230 such that the cover 205 is continuous between the sidewalls 230. The ring portion 235 conforms to the shape of the outer wall 215 and defines bead seats 240 adjacent the inner side of the sidewalls 140 to sealingly engage the tire bead 100.

Except for the lack of projections in the outer wall 215 and the lack of channels in the cover 205, the rim 200 and the cover 205 are the same as the rim 200 and the cover 205 described with regard to FIGS. 2-4. For example, each sidewall 230 has an exterior surface 245 that is shaped to smoothly transition to an exterior surface 250 of the inner wall 210 (e.g., to reduce drag and improve aerodynamic performance). As illustrated, the sidewalls 230 are engageable by the sidewalls 98 of the tire casing 95 and are curved outward relative to the central plane 232 such that the exterior surface 345 is concave.

Figure 6:
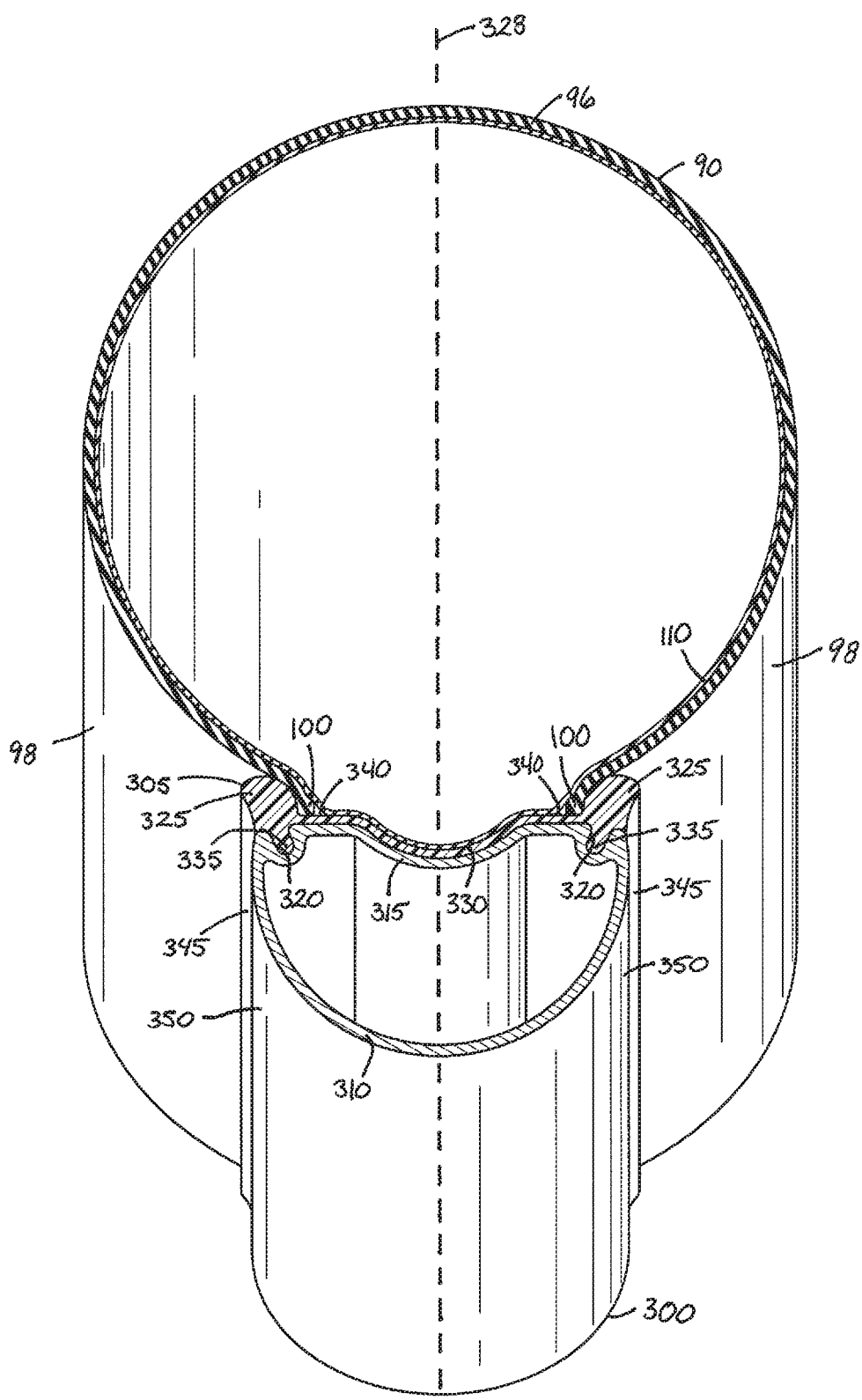
FIG. 6 is a section view of another exemplary rim and rim insert for a wheel.

FIG. 6 illustrates another exemplary rim 300 and cover 305 that can be used with the wheels 15, 20. The illustrated rim 300 includes an annular inner wall 310 and an annular outer wall 315 that has the first annular feature defined by channels 320 disposed in the rim 300 (i.e. adjacent or at the corner defined by the juncture between the inner and outer walls 310, 315).

The cover 305 includes annular sidewalls 325 disposed on lateral sides of the cover 305 (relative to a central plane 328), and a ring portion 330 that interconnects the sidewalls 325 such that the cover 305 is continuous between the sidewalls 325. The sidewalls 325 have the second annular feature that is defined by projections 335. The projections 335 extend from the radially-inner side of the cover 305 and are engaged with the channels 320 to attach the cover 305 to the rim 300. As will be appreciated, the first and second annular features defined by the rim 300 and the cover 305 illustrated in FIG. 6 are the reverse of the first and second annular features defined by the rim 75 and the cover 85 illustrated in FIGS. 3 and 4.

The ring portion 330 conforms to the shape of the outer wall 315 and defines bead seats 340 adjacent the inner side of the sidewalls 325 to sealingly engage the tire bead 100. In addition, each sidewall 325 has an exterior surface 345 that is shaped to smoothly transition to an exterior surface 350 of the inner wall 310 (e.g., to reduce drag and improve aerodynamic performance). As illustrated, the sidewalls 325 are engageable by the sidewalls 98 of the tire casing 95 and are curved outward relative to the central plane 328 such that the exterior surface 345 is concave.

Figure 7:
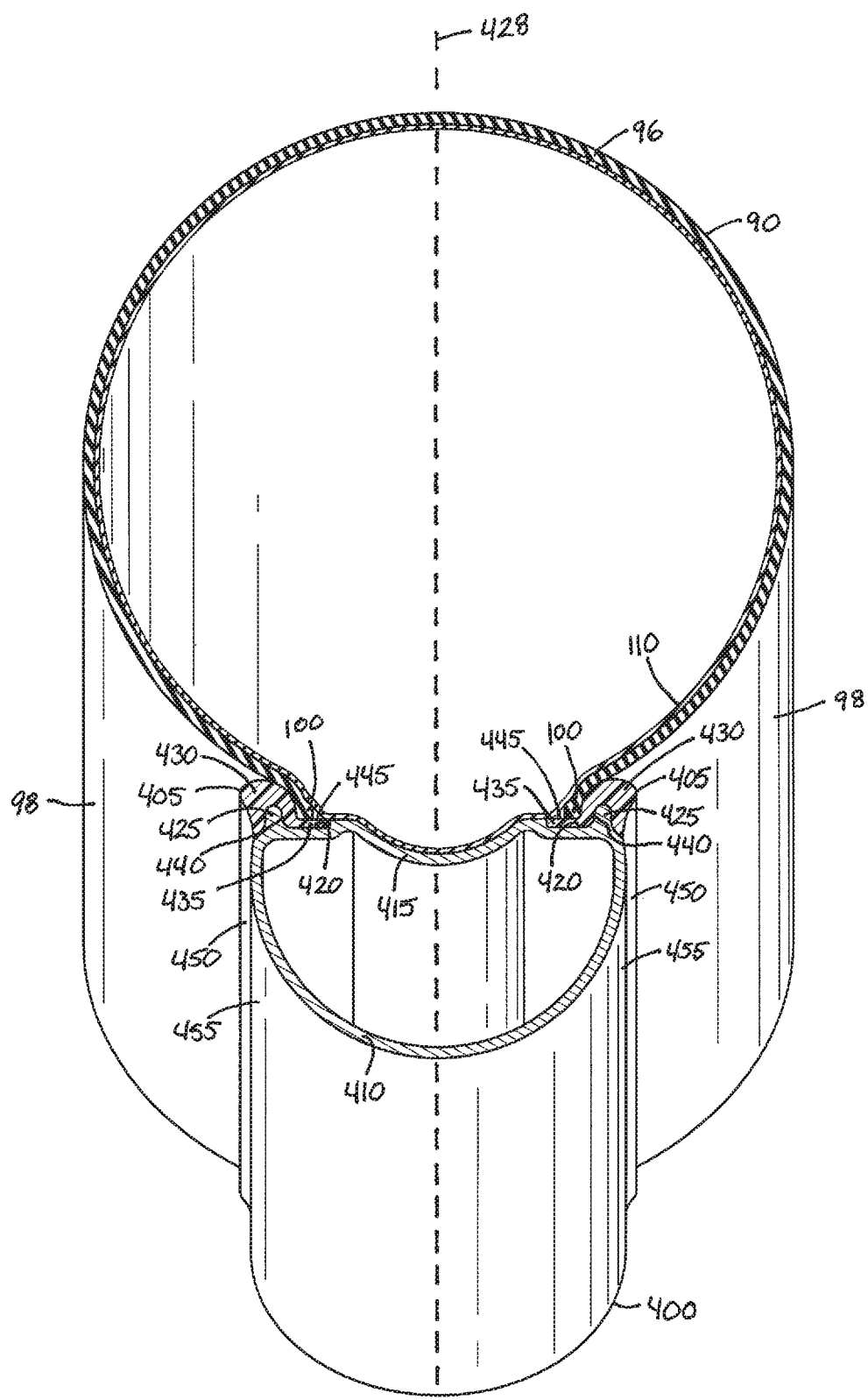
FIG. 7 is a section view of another exemplary rim and rim insert for a wheel.

FIG. 7 illustrates another exemplary rim 400 and two covers 405 that can be used with the wheels 15, 20. With reference to FIG. 7, the illustrated rim 400 includes inner and outer walls 410, 415 and is similar to the rim 400 described relative to FIGS. 2-4, except that the rim 400 also has a stepped portion or recess 420 (referred to as a "recess 420" for purposes of description) disposed between the central plane 105 and the first annular feature. As illustrated in FIG. 7, the first annular feature is defined by projections 425 extending from the outer wall 415 adjacent the lateral sides of the rim 400 (relative to a central plane 428).

The covers 405 define a two-piece cover assembly (i.e. a first cover 405 and a second cover 405) and are separately engaged with laterally opposed sides of the rim 400. Each cover 405 has a sidewall 430 and an annular ring portion 435. The sidewalls 430 have the second annular feature that is defined by channels 440 disposed in the radially-inner side of the cover 405. The channels 440 are engaged with the projections 425 to attach the cover to the rim 400. As will be appreciated, the first and second annular features defined by the rim 400 and the covers 405 illustrated in FIG. 7 are the same as the first and second annular features defined by the rim 75 and the cover 85 illustrated in FIGS. 3 and 4.

The ring portion 435 extends from the projection 425 laterally toward but stops short of the central plane 428 to define a bead seat 445 that is engageable by the tire bead 100. The ring portion 435 is positioned in the recess 420 such that an outer surface of the ring portion 435 blends with the outer surface of the outer wall 415 (i.e. the thickness of the ring portion 435 is the same or approximately the same as the depth of the recess 420). The ring portion 435 also increases the surface area of each cover so that the cover 405 can be more securely attached to and oriented on the rim 400. Although not shown, a rim strip can be placed over the area between the bead seats 445. Alternatively, this area can remain exposed (i.e. the wheel 15, 20 can be provided without a rim strip). The two-piece construction of the cover assembly decreases the amount of material needed to provide the covers 405, which reduces the total weight of the covers 405 relative to the weight of the one-piece covers 405 described with regard to FIGS. 3-6.

Each sidewall 430 has an exterior surface 450 that is shaped to smoothly transition to an exterior surface 455 of the inner wall 410 (e.g., to reduce drag and improve aerodynamic performance). As illustrated, the sidewalls 430 are engageable by the sidewalls 98 of the tire casing 95 and are curved outward relative to the central plane 428 such that the exterior surface 450 is concave.

Figure 8:
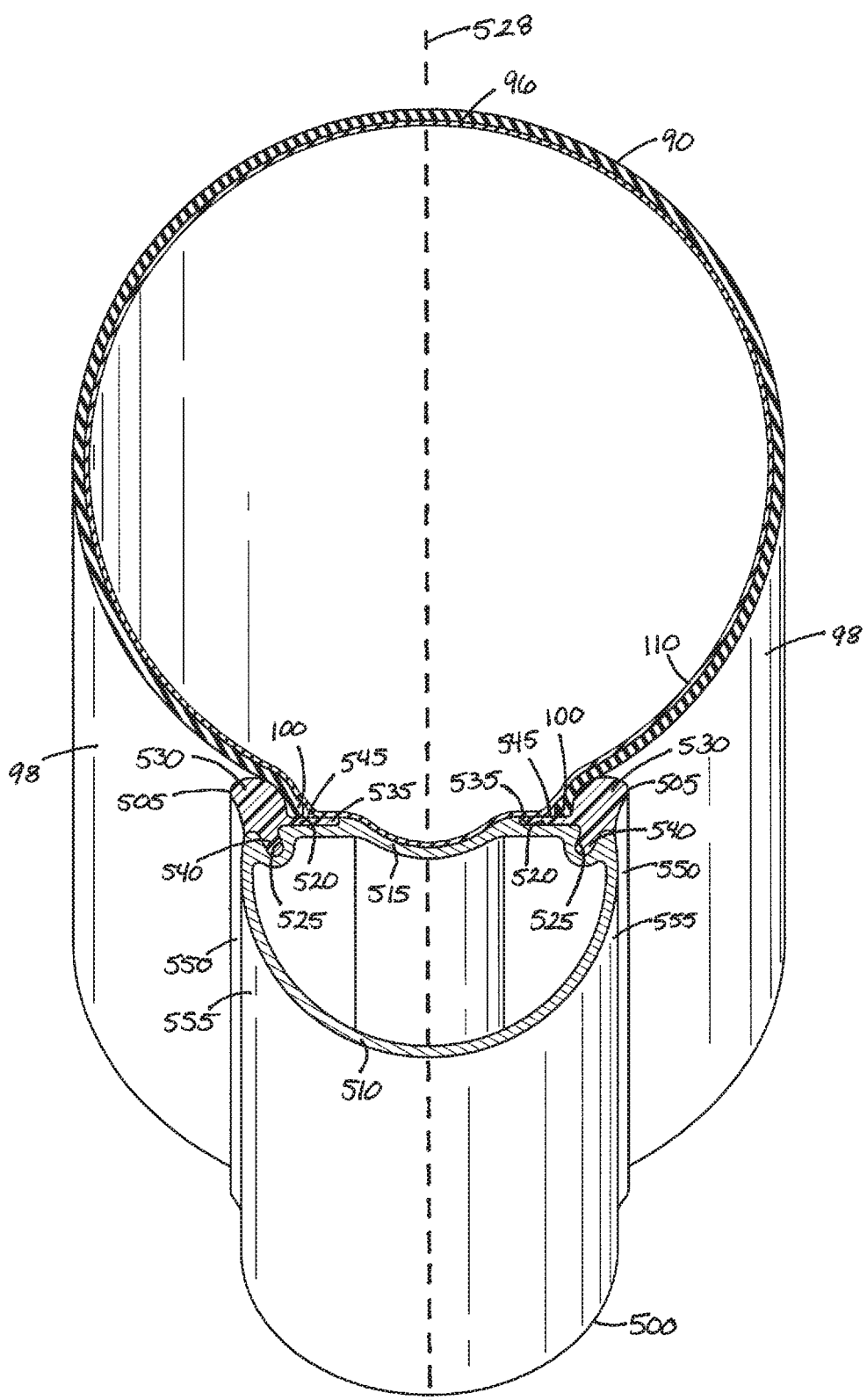
FIG. 8 is a section view of another exemplary rim and rim insert for a wheel.

FIG. 8 illustrates another exemplary rim 500 and two laterally-spaced covers 505 that can be used with the wheels 15, 20. With reference to FIG. 8, the illustrated rim 500 has inner and outer walls 510, 515. The rim 500 is similar to the rim 300 described relative to FIG. 6, except that the rim 500 also has a stepped portion or recess 520 (referred to as a "recess 520" for purposes of description). As illustrated in FIG. 7, the first annular feature is defined by channels 525 disposed in the outer wall 515 adjacent the lateral sides of the rim 500 (relative to a central plane 528).

The covers 505 define a two-piece cover assembly (i.e. a first cover 505 and a second cover 505) and are separately engaged with laterally opposed sides of the rim 500. Each cover 505 has a sidewall 530 and an annular ring portion 535. The sidewalls 530 have the second annular feature that is defined by annular projections 540. The projections 540 extend from the radially-inner side of the cover 505 and are engaged with the channels 525 to attach the cover 505 to the rim 500. As will be appreciated, the first and second annular features defined by the rim 500 and the cover 505 illustrated in FIG. 8 are the same as the features described with regard to FIG. 6, and the reverse of the features described with regard to FIG. 7. The ring portion 535 defines bead seats 545 and is the same as the ring portion 435 described with regard to FIG. 7. As such, the ring portion 535 will not be discussed in greater detail.

Each sidewall 530 has an exterior surface 550 that is shaped to smoothly transition to an exterior surface 555 of the inner wall 510 (e.g., to reduce drag and improve aerodynamic performance). As illustrated, the sidewalls 530 are engageable by the sidewalls 98 of the tire casing 95 and are curved outward relative to the central plane 528 such that the exterior surface 550 is concave.

The covers 85, 205, 305, 405, 505 described with regard to FIGS. 4-8 support the load generated by tire pressure when the tire 90 is inflated. To provide adequate support for this load, the cover is formed of a material that has a sufficient hardness to sealingly engage the tire 90. For example, the cover can be manufactured from a material that has a hardness of at least 50 on the Rockwell R scale (approximately a hardness of 60 on the Shore D scale). Preferably, the hardness of the cover is at least 60 Rockwell R (approximately 70 Shore D). For example, the cover can be manufactured from Ultra High Molecular Weight Polyethylene ("UHMW") that has a hardness of approximately 70 Rockwell R (approximately 80 Shore D). Other plastic or non-plastic material (e.g., Nylon, glass-filled Nylon, Acrylonitrile Butadiene Styrene ("ABS"), etc.) can be substituted for the UHMW material as long as the hardness is sufficient to support the tire pressure load generated by tire inflation, while still achieving a satisfactory seal (when used with a tubeless tire).

The covers 85, 205, 305, 405, 505 described with regard to FIGS. 4-8 can be assembled onto the rims 75, 200, 300, 400, 500, respectively, by co-molding or co-forming the cover and the rim, adhering the cover to the rim, or mechanically holding the cover in place on the rim (e.g., via a resilient connection). The illustrated cover is removably coupled to the rim, although the cover can be permanently attached. For example, the cover can be molded into or molded onto the rim (e.g., using a mold release) in a manner such that the cover can be removably installed on the rim. In another embodiment, the cover can elastically deform to tightly fit onto the rim. For example, any of the covers described with regard to FIGS. 3-8 can be heated or otherwise warmed up using a heat source prior to placing the cover on the rim such that the cover can be resiliently deformed (e.g., stretched) over or onto the rim. In some embodiments, the cover may be re-used after removal.

In general, the rim can be shaped to have one or more positive or negative engagement features that are complementary to features on the cover to attach the cover to the rim. Also, the thickness of the rim can be reduced to accommodate the thickness of the cover.

Each cover defines a compliant layer between the rim and the tire 90 that buffers impact and spreads the impact energy over a greater area. Because the cover is non-metallic and not quite as hard as the metallic or composite rim, the cover also can protect the rim if the bicycle 10 is ever be ridden with a flat tire. The cover also protects the tire 90 wall by supporting the lower part of the casing 95 to resist "pinch" flats. In this manner, the cover defines the tire-engaging portion of the wheel 15, 20 as well as a "bumper" that dampens impact and reduces the likelihood of "pinch" flats. Stated another way, the metallic or composite rim provides the strength and stiffness to the wheel 15, 20 and the non-metallic cover provides the toughness needed at the tire interface to secure the tire 90 to the rim while minimizing damage to the tire 90 and the rim.

Various features of the invention are set forth in the following claims.

The invention claimed is:

1. A bicycle wheel comprising:
   a hub;
   a rim coupled to the hub; and
   a cover coupled to the rim and including a sidewall, the cover at least partially defining a bead seat engageable by a tire bead,
   wherein a thickness of the sidewall is larger than a thickness of a wall of the rim.

2. The bicycle wheel of claim 1, further comprising a tire including the tire bead and a casing having tread and defining a sidewall of the tire, and wherein the cover is positioned to engage the tire bead and the sidewall such that the cover is constructed to predominantly support a load generated by tire pressure when the tire is inflated.

3. The bicycle wheel of claim 1, wherein the cover is stretchably attached to the rim.

4. The bicycle wheel of claim 1, wherein the rim and the cover include complementary engagement features to attach the cover to the rim.

5. The bicycle wheel of claim 1, wherein the rim includes a first annular feature and the cover includes a second annular feature, and wherein the first annular feature and the second annular feature are engaged with each other to attach the cover to the rim.

6. The bicycle wheel of claim 5, wherein the rim includes an annular wall, wherein the first annular feature includes one of an annular projection extending from the annular wall and an annular channel disposed in the annular wall, and wherein the second annular feature includes the other of the annular projection and the annular channel.

7. The bicycle wheel of claim 1, wherein the cover includes another sidewall such that the sidewalls are disposed adjacent lateral sides of the rim, and wherein the cover is continuous between the sidewalls.

8. The bicycle wheel of claim 1, wherein the rim includes an inner wall and an outer wall, and wherein the thickness of the cover is larger than a thickness of the outer wall.

9. The bicycle wheel of claim 1, wherein the rim includes an inner wall and an outer wall, and wherein the thickness of the cover is larger than a thickness of the inner wall.

10. The bicycle of claim 1, wherein the rim includes an annular wall, and wherein the thickness of the cover is defined in a direction along the central plane between an outer extent of the annular wall and an outer extent of the cover.

11. A bicycle wheel comprising:
a tire including a casing having tread and a tire bead;
a hub;
a rim coupled to the hub and including an annular wall; and
a cover coupled to the annular wall and positioned between the tire and the rim such that the tire is separated from the rim by the cover and the cover is constructed to provide rigidity and predominantly support a load generated by tire pressure when the tire is inflated.

12. The bicycle wheel of claim 11, wherein the cover includes a first sidewall disposed adjacent a first lateral side of the rim and a second sidewall disposed adjacent a second lateral side of the rim, and wherein the cover defines bead seats between the first and second sidewalls and is continuous between the sidewalls.

13. The bicycle wheel of claim 11, wherein the tire bead is a first tire bead and the casing has a second tire bead, wherein the cover is positioned adjacent a first lateral side of the rim, the bicycle wheel further comprising another cover coupled to the annular wall adjacent a second lateral side of the rim, and wherein each cover has a sidewall at least partially defining one bead seat such that each cover is engageable by the casing and one of the tire beads.

14. The bicycle wheel of claim 11, wherein the rim includes a first annular feature and the cover includes a second annular feature that is complementary to the first annular feature to attach the cover to the rim.

15. The bicycle wheel of claim 14, wherein the first annular feature includes one of an annular projection extending from the annular wall and an annular channel disposed in the annular wall, and wherein the second annular feature includes the other of the annular projection and the annular channel.

16. The bicycle wheel of claim 15, wherein the rim includes the annular projection and the cover includes the annular channel defined in the sidewall.

17. The bicycle wheel of claim 11, wherein the cover is stretchably attached to the rim.

18. The bicycle of claim 11, wherein the cover includes a sidewall having a thickness that is larger than a thickness of the annular wall.

19. A bicycle wheel comprising:
a hub;
a rim coupled to the hub and including a wall; and
a first cover coupled to the rim and including a first sidewall, the cover at least partially defining a first bead seat engageable by a tire bead,
a second cover separately coupled to the rim and including a second sidewall, the second cover at least partially defining a second bead seat engageable by another tire bead,
wherein a thickness of each of the first sidewall and the second sidewall is larger than a thickness of a wall of the rim.

20. The bicycle wheel of claim 19, further comprising a tire including a casing having a tread and the first and second tire beads, wherein the first cover and the second cover are constructed to predominantly support a load generated by tire pressure when the tire is inflated.

* * * * *